(12) United States Patent
Matsuzaki (10) Patent No.: US 8,374,487 B2
(45) Date of Patent: Feb. 12, 2013

(54) INFORMATION PROCESSING FOR GENERATING AN INFORMATION LIST OF VIDEO CONTENTS

(75) Inventor: Katsuro Matsuzaki, Kanagawa (JP)

(73) Assignee: Sony Corporation (JP)

( * ) Notice: Subject to any disclaimer, the term of this patent is extended or adjusted under 35 U.S.C. 154(b) by 1629 days.

(21) Appl. No.: 10/197,323

(22) Filed: Jul. 16, 2002

(65) Prior Publication Data

US 2003/0033502 A1    Feb. 13, 2003

(30) Foreign Application Priority Data

Jul. 17, 2001  (JP) .................................. 2001-216221

(51) Int. Cl.
*H04N 9/80* (2006.01)
*H04N 5/93* (2006.01)
(52) U.S. Cl. ........................................ 386/248; 386/278
(58) Field of Classification Search ........................ None
See application file for complete search history.

(56) References Cited

U.S. PATENT DOCUMENTS

| | | | |
|---|---|---|---|
| 6,658,439 B2 * | 12/2003 | Karasudani | 1/1 |
| 2003/0093790 A1 * | 5/2003 | Logan et al. | 725/38 |
| 2003/0177503 A1 * | 9/2003 | Sull et al. | 725/112 |
| 2008/0187280 A1 * | 8/2008 | Hassell et al. | 386/52 |

FOREIGN PATENT DOCUMENTS

WO    WO 9222983 A2 * 12/1992

* cited by examiner

*Primary Examiner* — William C Vaughn, Jr.
*Assistant Examiner* — Heather Jones
(74) *Attorney, Agent, or Firm* — Lerner, David, Littenberg, Krumholz & Mentlik, LLP (57) ABSTRACT

An information processing apparatus and method are adapted for facilitating management of recorded programs and contents information thereof. The information processing apparatus includes a retrieval unit operable to retrieve first information with an identifier attached thereto; a decision unit operable to decide whether there exists a list corresponding to the identifier; a registration unit operable to register the first information on the list when the list exists; and a forming unit operable to form second information by rearranging a plurality of the first information registered on the list.

16 Claims, 8 Drawing Sheets

201 — TARGET IMAGE SPECIFIED
```
<ProgramIndex>
  <Target>
   <Area id="Tokyo">
   <Channel network="Terrestrial">4</Channel>
   <StartTime>2001-05-30T19:00:00.0+09:00</StartTime>
   <EndTime>2001-05-30T20:00:00.0+09:00</EndTime>
  </Target>
```

202 — IMAGE INDEX METADATA
```
  <Index>
   <Marker>
    <Position>00:05:15.000</Position>
    <Description>Economic news</Description>
   <Marker>
  </Index>
```

203 — IMAGE SEGMENT GROUP METADATA
```
  <Story title="News digest">
   <Segment seq="1">
    <StartPosition>00:03:22.000</StartPosition>
    <EndPosition>00:04:35.000</EndPosition>
    <Description>Top news</Description>
   </Segment>
   <Segment seq="2">
    <StartPosition>00:05:15.000</StartPosition>
    <EndPosition>00:06:35.000</EndPosition>
    <Description>Economic news</Description>
   </Segment>
  </Story>
<ProgramIndex>
```

FIG. 6

```
<ProgramIndex>
<Target>
    <Area id ="Tokyo"/>
    <Channel network ="Terrestrial">4</Network>
    <StartTime>2001-05-30T19:00:00.00+09:00</StartTime>
    <EndTime>2001-05-30T19:59:59.00+09:00</EndTime>
</Target>
<Story title = "Ichiro special" id ="id_ichiro" seq ="1">
    <Segment>
       <StartPosition>00:01:00.000</StartPosition>
       <EndPosition>00:03:10.000</EndPosition>
       <Description>Looking back on his past activity</Description>
    </Segment>
</Story>
</ProgramIndex>
```
211-1

```
<ProgramIndex>
<Target>
    <Area id ="Tokyo"/>
    <Channel network ="Terrestrial">1</Network>
    <StartTime>2001-06-01T20:00:00.00+09:00</StartTime>
    <EndTime>2001-06-01T20:54:00.00+09:00</EndTime>
</Target>
<Story title = "Ichiro special" id ="id_ichiro" seq ="23">
    <Segment>
       <StartPosition>00:10:00.000</StartPosition>
       <EndPosition>00:14:25.000</EndPosition>
       <Description>Today's Ichiro</Description>
    </Segment>
</Story>
</ProgramIndex>
```
211-2

INFORMATION PROCESSING FOR GENERATING AN INFORMATION LIST OF VIDEO CONTENTS

CROSS-REFERENCE TO RELATED APPLICATIONS

The present application claims priority from Japanese Application No. 2001-216221 filed Jul. 17, 2001, the disclosure of which is hereby incorporated by reference herein.

BACKGROUND OF THE INVENTION

The present invention relates to an information processing apparatus and method, a recording medium and a program, and more particularly to those adapted for facilitating management of recorded programs and contents information thereof in the case of forming a virtual program based on a certain theme.

Recently, hard disk recorders have been commercialized and distributed widely in homes. With such hard disk recorders, it is possible for a user to record any broadcast contents directly and to enjoy the recorded contents by viewing and listening to the same at any desired time. Further, since a disk is employed as a recording medium, random access thereto is easier in comparison with a magnetic tape, and partial video images in the broadcast contents can be selectively picked up and edited for reproduction.

As a result, the user is able to record, on a hard disk, a virtual program edited in accordance with the user's preference.

In general, when a virtual program is formed on the basis of a certain theme, information (metadata) relative to such a virtual program is handled as one file.

However, where a plurality of virtual programs exist, the relationship between the information relative to the actual programs recorded by the hard disk recorder and the information relative to the virtual programs formed (edited) by the user becomes a many-to-many cross-reference.

Figure 1:
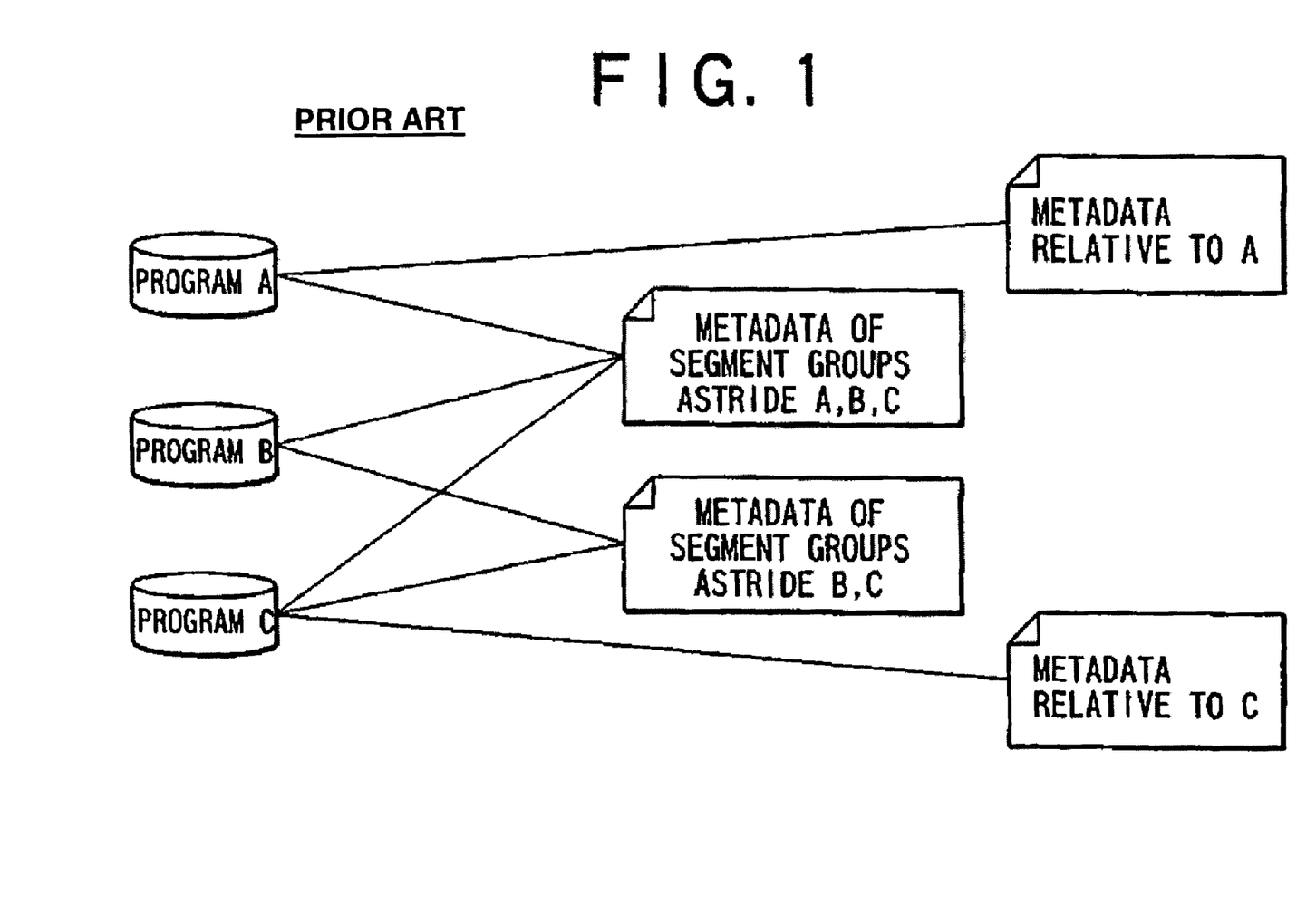
FIG. 1 is a diagram for explaining the relationship between recorded programs and metadata thereof according to the prior art.

More specifically, when metadata relative to a plurality of program contents are permitted to exist with regard to recorded programs A, B and C as shown in FIG. 1, if there are described metadata of segment groups (virtual program) astride the plural programs (e.g., metadata of segment groups astride the programs A, B, C and metadata of segment groups astride the programs B, C in the example of FIG. 1), then the relationship between the recorded programs and the metadata becomes many-to-many.

However, when the program B is to be deleted in the example of FIG. 1, the metadata relative to the program B alone may be deleted directly, but there arises the necessity of deleting, from the metadata of the segment groups, only the portion relative to the program B. Further, in a play (reproduction) mode also, the segment groups astride the plural programs need to be reproduced in consideration of the deletion of the program B, hence rendering the reproduction process intricate.

Thus, in the physical deletion of any recorded program, it is necessary to check if the virtual program information can be deleted while collating with the recorded program, thereby complicating management of the programs and the program contents information.

In addition, when acquiring metadata from some other apparatus via a network, it is necessary to determine which of the programs are recorded on the hard disk so as to acquire the metadata of segment groups astride plural programs, whereby the operation is rendered more intricate.

SUMMARY OF THE INVENTION

It is therefore an object of the present invention to facilitate management of recorded programs and contents information thereof by setting the relationship between the programs and the program contents information as one-to-many.

According to one aspect of the present invention, there is provided an information processing apparatus which includes a retrieval unit operable to retrieve first information with an identifier attached thereto; a decision unit operable to make a decision as to whether a list corresponding to the identifier exists; a registration unit operable to register the first information on the list if the decision signifies that the list exists; and a forming unit operable to form second information by rearranging a plurality of the first information registered on the list.

The apparatus may further include a generation unit operable to generate the list on the basis of the identifiers attached to the first information if the decision signifies that the list does not exist.

The first information may contain a description of ordinal numbers thereof, and the forming unit is capable of rearranging a plurality of the first information in conformity with the ordinal numbers.

The first and second information may be composed of a plurality of segments.

According to another aspect of the present invention, there are provided an information processing method, a recording medium and a program. The method includes retrieving first information with an identifier attached thereto; making a decision as to whether a list corresponding to the identifier exists; registering the first information on the list if the decision signifies that the list exists; and forming second information by rearranging a plurality of the first information registered on the list.

In the information processing apparatus and method of the present invention and the program thereof, the first information with the identifier attached thereto is retrieved, and a decision is made as to whether a list corresponding to the identifier exists. If the result of such decision signifies that the list exists, the retrieved first information is registered on the list, and a plurality of the first information are rearranged to form second information.

The above and other features and advantages of the present invention will become apparent from the following description which will be given with reference to the illustrative accompanying drawings.

DETAILED DESCRIPTION

Hereinafter some preferred embodiments of the present invention will be described in detail with reference to the accompanying drawings.

Figure 2:
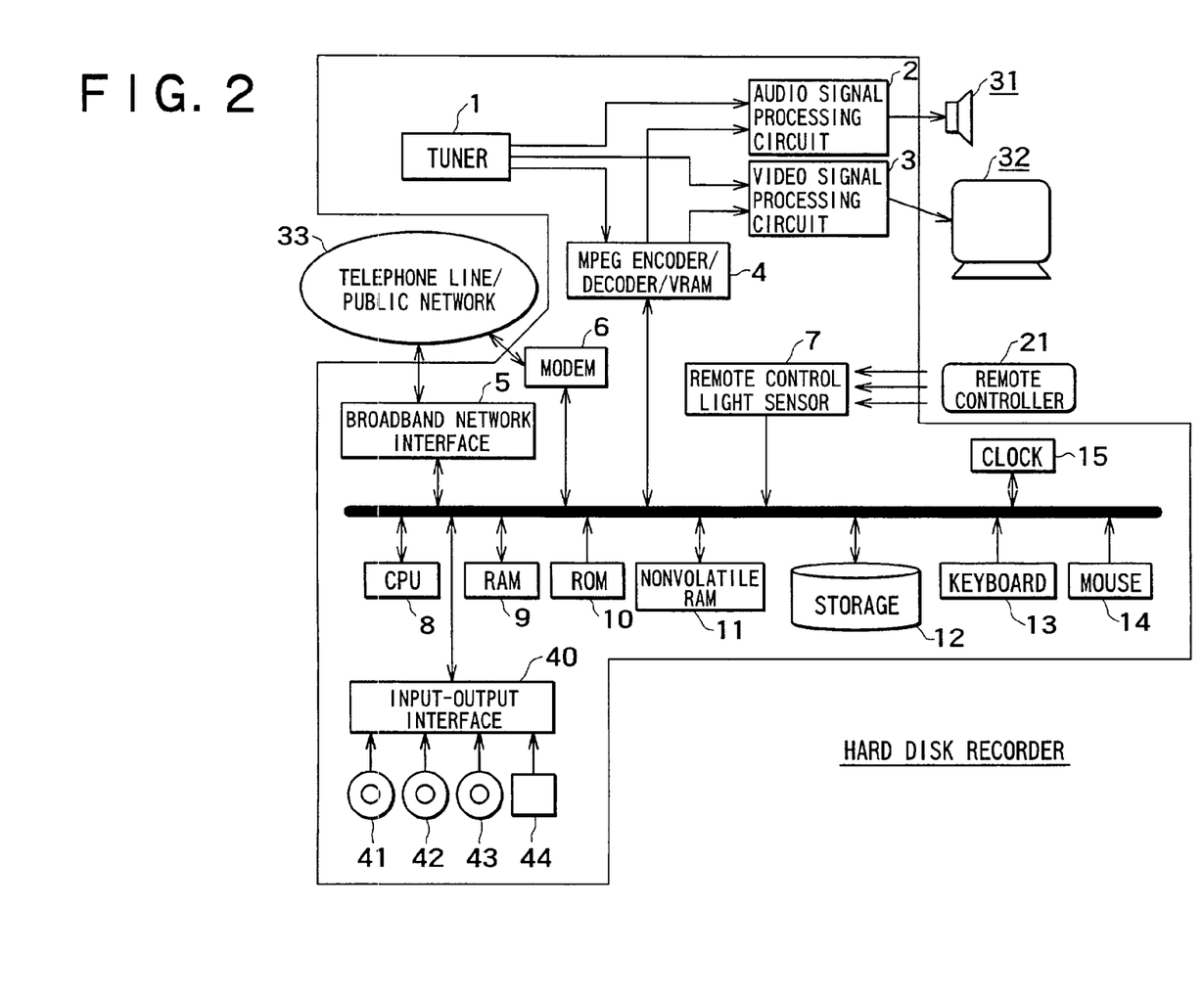
FIG. 2 is a block diagram showing a structural example of a hard disk recorder where the present invention is applied.

FIG. 2 is a block diagram showing a structural example of a hard disk recorder where the present invention is applied.

A tuner 1 receives television signals of terrestrial waves or those from a communication satellite or a broadcasting satellite, and outputs the extracted video signal to a video signal processing circuit 3 and the extracted audio signal to an audio signal processing circuit 2. The tuner 1 also supplies the received video and audio signals to an MPEG (Motion Picture Experts Group) encoder/decoder/VRAM (Video Random Access Memory) 4. The MPEG encoder/decoder/VRAM 4 encodes the input signals in conformity with the MPEG standard, and supplies the encoded signals to a storage 12 consisting of a hard disk, hence recording the encoded signals therein.

The tuner 1 further receives an EPG (Electrical Program Guide) relative to the program (also metadata, if included, with information relative to the index and segments of the contents), and supplies the received EPG and so forth to the storage 12 for storing the same therein. When the signals received by the tuner 1 are recorded, there are further stored, in the storage 12, the recording start time, the recording time length, the channel number of the received and recorded broadcast, the category of the program and so forth.

The metadata contain both the index and the segments. The index corresponds to a predetermined time of the contents, with attachment of a comment and an icon relative to the contents at that time. The segment corresponds to a predetermined period representing, e.g., a highlight scene of the contents, with attachment of its start time, end time, comment and icon.

In case the story is composed of an optional number of segments, the story also is stored in the storage 12.

The MPEG encoder/decoder/VRAM 4 decodes the signals reproduced from the storage 12 in conformity with the MPEG standard, then writes the video data once in an internal VRAM and, after reading out the data therefrom again, outputs the data to the video signal processing circuit 3. Meanwhile, the reproduced audio data are decoded and then output to the audio signal processing circuit 2.

The video signal processing circuit 3 processes the input video signals in a predetermined manner and, after converting the same into analog signals, outputs the converted signals to a display unit 32 for displaying the image thereon. Meanwhile, the audio signal processing circuit 2 processes the input audio signals in a predetermined manner and, after converting the same into analog signals, outputs the converted signals to a speaker 31.

Also recorded in the storage 12 are the information data (such as broadcast date and time, channel number and so forth) relevant to the recorded video signals, in addition to the video or audio contents. The storage 12 further stores an OS (operating system), application program, and data relevant to the application program.

In a nonvolatile RAM (random access memory) 11 are stored ID information related to the hard disk recorder, ID information of the user, area information of the user's residence and so forth. In a ROM (read only memory) 10 are stored a bootstrap module for booting up the OS, other programs and parameter data. In a RAM 9, the bootstrap module, the OS and the application program are expanded from the ROM 10 and the storage 12 when necessary, and are executed by a CPU (central processing unit) 8.

The data to be stored in the storage 12 are recordable in the RAM 9 or the nonvolatile RAM 11, for example.

When a predetermined command has been input from a keyboard 13 or a mouse 14 manipulated by the user, the CPU 8 executes a process corresponding to such command. A clock 15 performs a timing operation and outputs time information.

This hard disk recorder is equipped with a remote-control light sensor 7. In response to an infrared signal generated from a light emitter 61 (FIG. 3) of a remote controller 21 as a result of manipulation by the user, the light sensor 7 receives the infrared signal and then outputs a corresponding signal to the CPU 8.

In displaying a GUI (graphical user interface) picture for the user's manipulation (e.g., a picture for selecting a desired video content to be reproduced from a displayed summary of all of the video contents), GUI display image data generated through execution of a GUI processing program by the CPU 8 are supplied to the MPEG encoder/decoder/VRAM 4 and then are output to the display unit 32 via the video signal processing circuit 3.

A modem 6 executes a process of communicating with a telephone line/public network 33. The modem 6 is used when receiving the OS or the application program updating information, or when transmitting data from the user to a broadcasting station or a data server. The modem 6 also receives any metadata distributed from the telephone line/public network 33.

A broadband network interface 5 is connected to a broadband network such as a DSL (digital subscribe line), CATV (cable television), optical fiber or the like out of the telephone line/public network 33. The broadband network interface 5 is used when receiving the OS or the application program updating information, or when transmitting data from the user to a broadcasting station or a data server. The broadband network interface 5 is also used when metadata are transmitted via the broadband network.

A magnetic disk 41, an optical disk 42, a magneto-optical disk 43 or a semiconductor memory 44 is operatively connected to the other components in the hard disk recorder via an input-output interface 40 in accordance with requirements.

Figure 3:
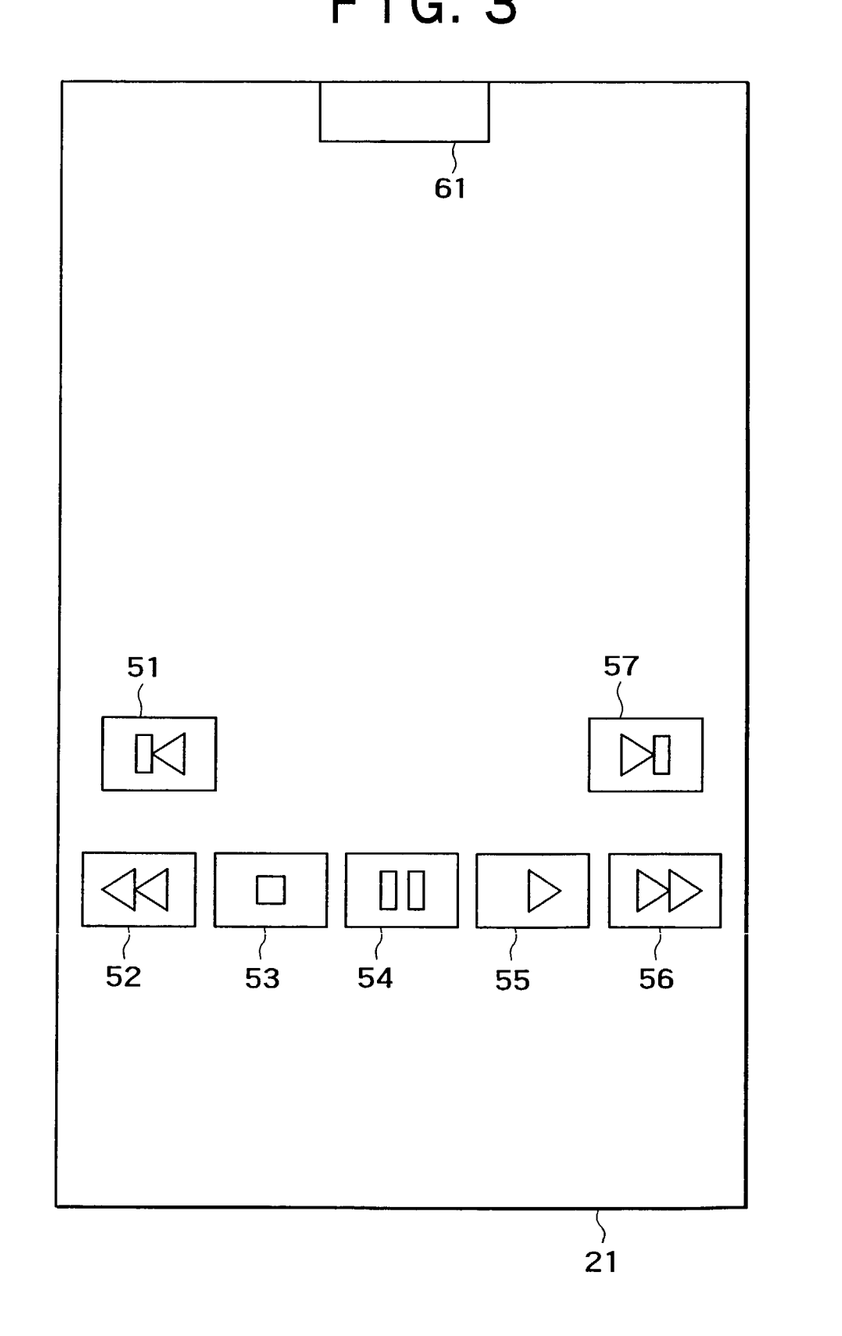
FIG. 3 is a diagram showing a structural example of the remote controller in FIG. 2.

FIG. 3 shows a structural example of the remote controller 21, principally with regard to the buttons thereon.

A backward skip button 51 or a forward skip button 57 is manipulated individually by the user when skipping temporally backward or forward the segment (or index) to be reproduced. A review button 52 is manipulated when quickly moving a play (reproduction) position backward. A stop button 53 is manipulated when stopping the play. A pause button 54 is manipulated when temporarily pausing the play or recording mode. A play button 55 is manipulated when starting the play. And a cue button 56 is manipulated when quickly moving the play position forward.

A light emitter 61 has an internal infrared-ray emitting element therein. When any of the above buttons has been manipulated, the light emitter 61 emits an infrared signal corresponding to the manipulation to the remote-control light sensor 7.

Although not shown in the diagram, the remote controller 21 is further equipped with other various buttons including ten numeral buttons.

Now the fundamental operation of the above hard disk recorder will be explained below.

When the user has commanded reception of predetermined contents by manipulating the remote controller 21, the keyboard 13 or the mouse 14, the CPU 8 controls the tuner 1 to receive a specified broadcast channel. The tuner 1 receives waves of the specified channel under control of the CPU 8, and outputs the demodulated signals to the MPEG encoder/decoder/VRAM 4. The MPEG encoder/decoder/VRAM 4 then encodes the signals supplied from the tuner 1 in conformity with the MPEG standard, and supplies the encoded signals to the storage 12 for storing the same therein.

The contents are thus stored in the storage 12. Metadata corresponding to the contents are transmitted from an unshown server via the telephone line/public network 33 to the modem 6, and the received metadata are also stored in the storage 12. The metadata may be generated by the user individually and stored in the storage 12. Some examples of metadata will be described later with reference to FIG. 5.

When the user has commanded play (reproduction) of the metadata by manipulating the remote controller 21, the keyboard 13 or the mouse 14, the CPU 8 out the metadata stored in the storage 12 and, after generating a summary thereof, outputs the summary from the MPEG encoder/decoder/VRAM 4 via the video signal processing circuit 3 to the display unit 32, hence displaying the summary thereon.

Figure 4:
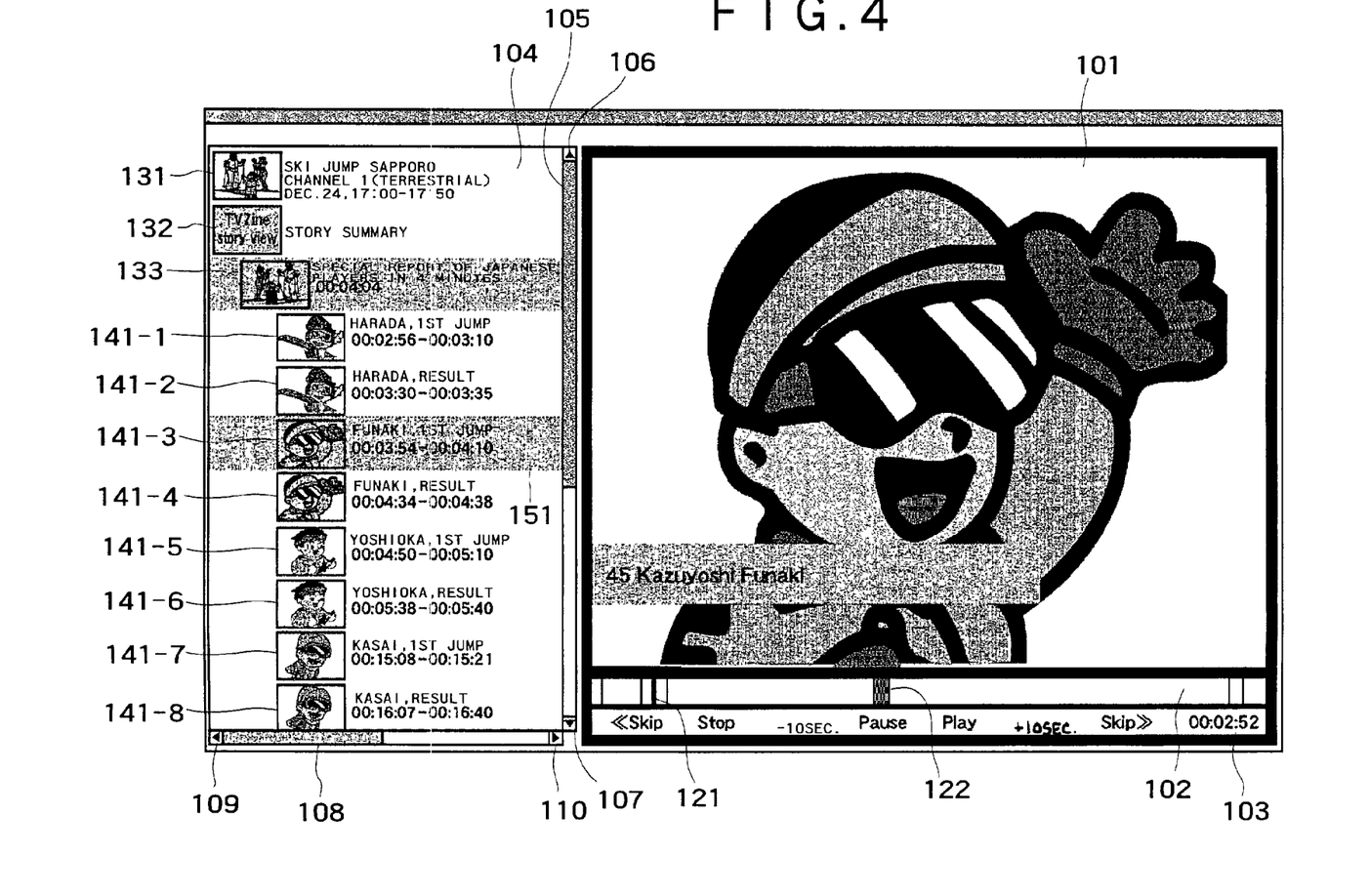
FIG. 4 shows a display example on the display unit in FIG. 2.

FIG. 4 shows an example displayed in the case mentioned above. In this example, a story (segment group) corresponding to the metadata and a summary of the segments is displayed in a display region 104. In a display region 131, there is displayed information relative to the entire program being reproduced. In this example, there are displayed representative thumbnail pictures and characters of "Ski jump", "Channel 1 (Terrestrial)", and "December 24, 17:00-17:50". Here, the segment group signifies a virtual program obtained by rearranging the broadcast contents.

In a next display region 132, a story summary is displayed. In this example, a story titled "Special report of Japanese players in four minutes" a display region 133 is selected out of plural stories displayed under the display region 132 of the story summary, and the segments constituting the story are displayed successively in display regions 141-1 to 141-8. The total reproduction time of the stories is shown as "00:04:04" (4 minutes and 4 seconds).

The title in the display region 141-1 is "Harada, 1st jump", there is displayed a segment signifying that the reproduction time of the contents is from "00:02:56" to "00:03:10" relative to the entire contents.

The title in the display region 141-2 is "Harada, result" there is displayed a segment signifying that the reproduction time relative to the entire contents is from "00:03:30" to "00:03:35".

The title in the display region 141-3 is "Funaki, 1st jump", there is displayed a segment signifying that the reproduction time relative to the entire contents is from "00:03:54" to "00:04:10".

In this display region 141-3, there also is displayed a marker 151 signifying that the segment is being currently reproduced. The picture representing the contents of this segment is displayed in a display region 101.

In the subsequent display regions 141-4 to 141-8, similarly to the above, there are displayed the respective titles and segments of the contents, each signifying the reproduction time relative to the entire contents.

At the right side of the display region 104, a scroll button 106 and a scroll button 107 are displayed, and a scroll bar 105 is displayed therebetween. The user is able to use the buttons 106, 107 to vertically scroll through the display region 104 by manipulating the mouse 14.

At the lower end of the display region 104, a scroll button 109 and a scroll button 110 are displayed, and a scroll bar 108 is displayed therebetween. The user is able to use the buttons 109, 110 to scroll horizontally through the display region 104 by manipulating the mouse 14.

The display region 101 for displaying the picture of the contents is formed on the right side of the display region 104. Further, a display region 102 and a display region 103 are defined under the display region 101.

In the display region 102 is displayed a current position indicator bar 121. The left end of the display region 102 corresponds to the play start time of the subject content in the story (in this case, the story of "Special report of Japanese players in four minutes"). And the right end thereof corresponds to the play end time of the subject content. The current position indicator bar 121 is displayed at the relative position prescribed by the play start time of the story and the play end time thereof. The displayed position of the current position indicator bar 121 changes successively as the reproduction of the story progresses.

In addition to the current position indicator bar 121, there is also displayed, in the display region 102, a position where a segment bar 122 corresponds to the range of reproduction. In this case, the left end of the display region 102 corresponds to the play start time of the subject content of the segment being currently reproduced. And the right end thereof corresponds to the play end time of the subject content. The segment bar 122 is displayed at the relative position prescribed by the play start time and the play end time of the subject content of that segment. The displayed position of the current position indicator bar 121 changes successively as the reproduction of the segment progresses.

It is a matter of course that, although not shown, an index bar and so forth may be displayed as well. In this case, an index bar is displayed at the relative position prescribed by the play start time of the subject content indicated by the index.

Buttons to be manipulated by the user are displayed in the display region 103 under the display region 102. "<<Skip" the left end is a backward skip button (corresponding to the backward skip button 51 in FIG. 3) manipulated for backward skip, and "Stop" a stop button (corresponding to the stop button 53 in FIG. 3). The "−10 sec" button is manipulated to change the current play position temporally by 10 seconds backward.

"Pause" a pause button corresponding to the pause button 54 in FIG. 3. "Play" a button manipulated for starting play (reproduction), and it corresponds to the play button 55 in FIG. 3.

The "+10 sec" button is manipulated to change the current play position temporally by 10 seconds forward. And "Skip >>" a forward skip button which corresponds to the forward skip button 57 in FIG. 3.

At the right end of the display region 103, there are displayed numerals which denote the time signifying the current display position of the picture being displayed in the display region 101. In the example of FIG. 4, the picture in the display region 101 is at the temporal position of "00:02:52" from the play start time.

Figure 5:
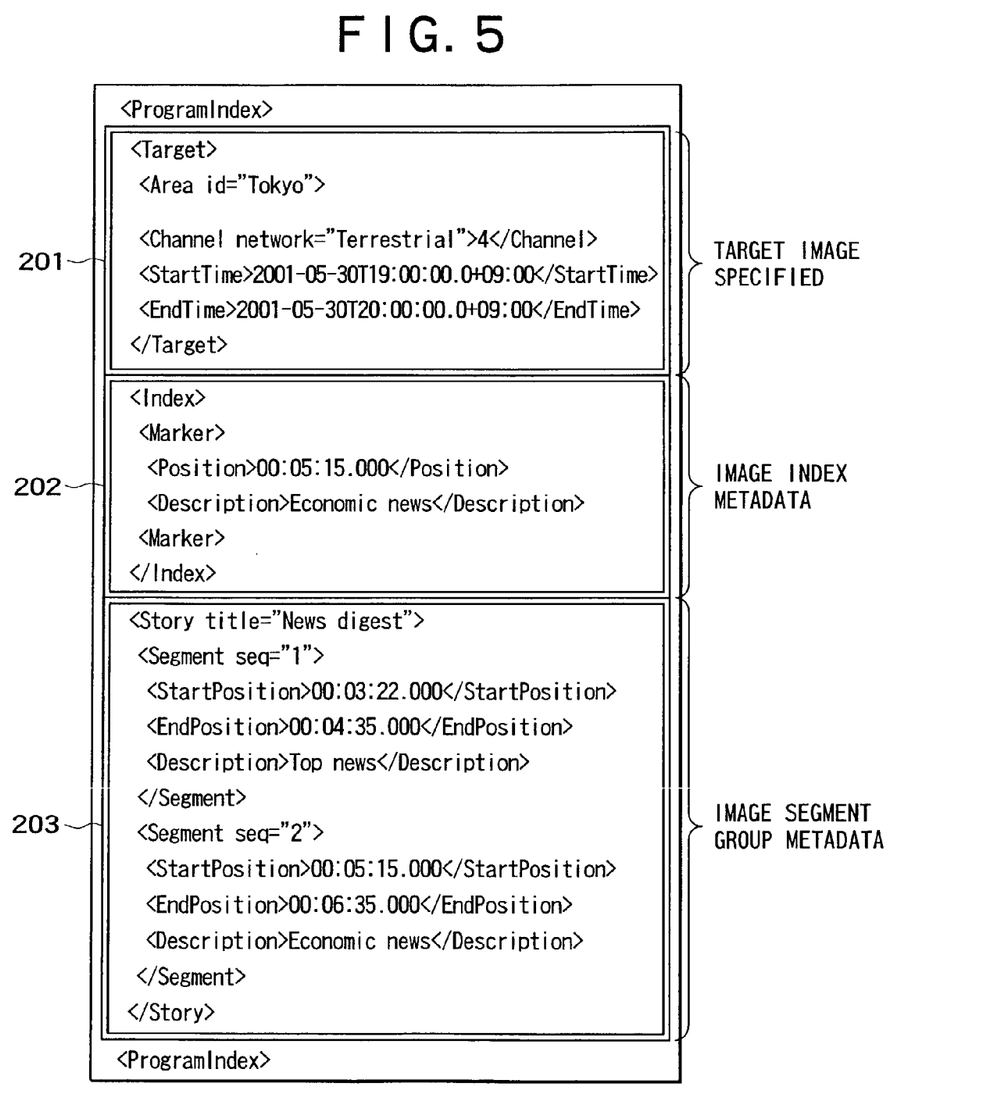
FIG. 5 shows some examples of metadata.

FIG. 5 shows some examples of metadata in the XML (extensible markup language) format.

In the example of FIG. 5, a target image or content is specified in block 201. <Area id="Tokyo">signifies that the broadcast area of this content is "Tokyo"; <Channel network="Terrestrial">4</Channel> signifies that the content is broadcast on "Terrestrial channel 4"; <StartTime> 2001-05-30T19:00:00 signifies that the broadcast start time of the content is 19:00, May 30, 2001; and <EndTime>2001-

05-30T20:00:00 signifies that the broadcast end time of the content is 20:00, May 30, 2001.

Block 202 for the next image index metadata shows the index of a jump destination in scanning. In this example, the position of relative time 00:05:15 is specified as an index. The description of this index is "Economic news".

Block 203 for the image segment group metadata prescribes two segments of seq=1 and seq=2.

The start time of the segment seq=1 is set to a relative time of 00:03:22, and the end time thereof is set to a relative time of 00:04:35. The description of this segment is "Top news".

The start time of the segment seq=2 is set to a relative time of 00:05:15, and the end time thereof is set to a relative time of 00:06:35. The description of this segment is "Economic news".

Block 203 for the image segment group metadata may include, in addition to the above, icon information, memo (text) information and so forth. And each segment may also include icon information, memo information and so forth.

When image segment group metadata have been created as an index, if scanning is commanded in a reproduction mode, the image of the jumping action is repeatedly reproduced in succession until arrival of the next index position.

In contrast therewith, when the image segment group metadata have been specified, the segment ranges prescribed by the start and end points are reproduced in succession.

Figure 6:
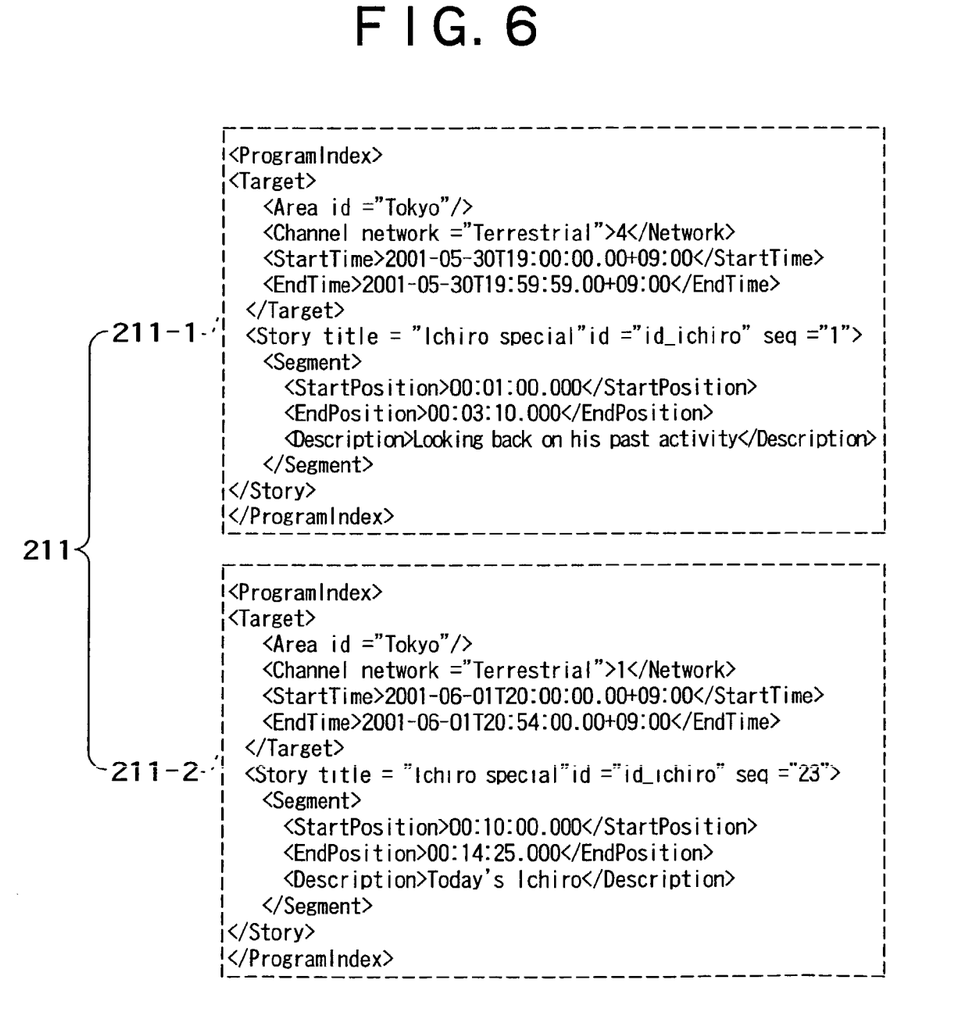
FIG. 6 shows some more examples of metadata in case segment groups are astride plural programs.

FIG. 6 shows some examples of metadata in the XML format when segment groups (virtual program) are astride plural programs.

In the example of FIG. 6, there is shown metadata 211 composed of metadata 211-1 and 211-2, wherein the subject contents of the metadata 211-1 are described in the 2nd to 7th lines (from Target to /Target), and the subject contents of the metadata 211-2 are described in the 17th to 22nd lines (from Target to /Target).

<Area id="Tokyo"/> in the 3rd line signifies that the broadcast area relevant to the contents of the metadata 211-1 is "Tokyo" Channel network="Terrestrial">4</Network> in the 4th line signifies that the contents have been broadcast on "Terrestrial channel 4". <StartTime>2001-05-30T19:00:00 in the 5th line signifies that the broadcast start time of the contents is 19:00:00, May 30, 2001. <EndTime>2001-05-30T19:59:59 in the 6th line signifies that the broadcast end time thereof is 19:59:59, May 30, 2001. <Story title="Ichiro special" id="id_ichiro"seq="1"> in the 8th line signifies that the title of the broadcast contents (segment group) is "Ichiro special" and that the identifier of the metadata 211-1 is "_ichiro" an ordinal number "1" is assigned to the segment group having an identifier of "id_ichiro". The ordinal number is used for rearranging the metadata in the segment group forming routine which will be mentioned later with reference to FIG. 7.

One segment is shown as an exemplary story of "Ichiro special", wherein its start time point is set to "00:01:00" its end time point is set to "00:03:10" a comment of "Looking back on his past activity" given as information (description) for identifying the contents.

The broadcast contents of the metadata 211-1 are specified on the basis of such area, channel, broadcast start time and end time.

<Area id="Tokyo"/>in the 18th line signifies that the broadcast area relevant to the contents of the metadata 211-2 is "Tokyo" Channel network="Terrestrial">1</Network> in the 19th line signifies that the contents have been broadcast on "Terrestrial channel 1". <StartTime>2001-06-01T20:00:00 in the 20th line signifies that the broadcast start time of the contents is 20:00:00, Jun. 1, 2001. <EndTime>2001-06-01T20:54:00 in the 21st line signifies that the broadcast end time thereof is 20:54:00, Jun. 1, 2001. <Story title="Ichiro special" id="id_ichiro" seq="23"> in the 23rd line signifies that the title of the broadcast contents (segment group) is "Ichiro special" and that the identifier of the metadata 211-2 is "id_ichiro" an ordinal number "23" is assigned to the segment group having an identifier of "id_ichiro".

One segment is shown as an exemplary story of "Ichiro special", wherein its start time point is set to "00:10:00" its end time point is set to "00:14:25" a comment of "Today's Ichiro" given as information (description) for identifying the contents.

The broadcast contents of the metadata 211-2 are specified on the basis of such area, channel, broadcast start time and end time.

The CPU 8 retrieves all of the metadata recorded in the storage 12 and then combines the segment groups having the same identifier ("id_ichiro" the example of FIG. 6), thereby forming a segment group astride plural programs.

Figure 7:
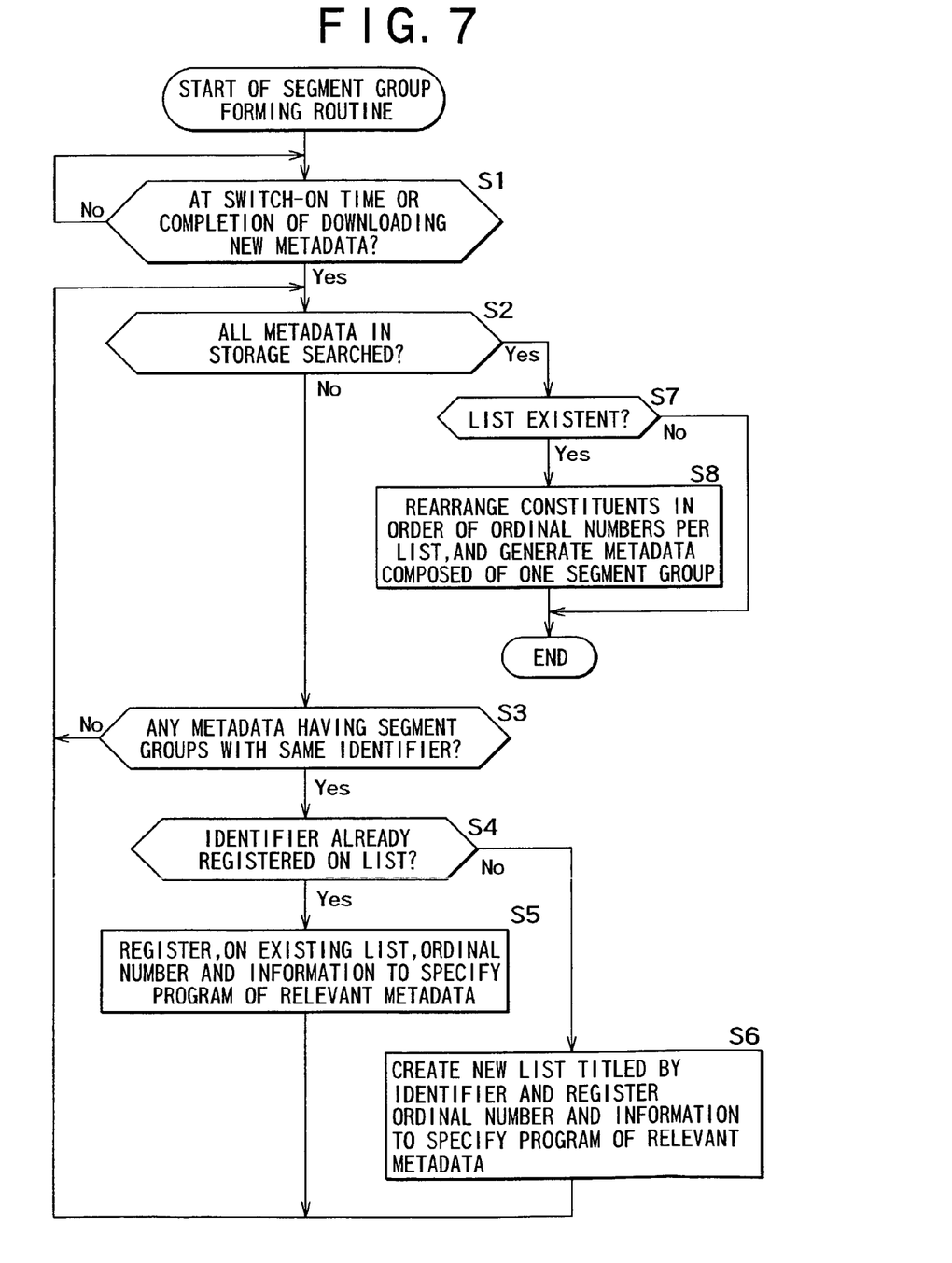
FIG. 7 is a flowchart for explaining a processing routine to form a segment group in the hard disk recorder of FIG. 2.

The processing routine executed in this case will now be explained below with reference to the flowchart of FIG. 7.

At step S1, the CPU 8 makes a decision as to whether the hard disk recorder is in a state of its switch-on time (at initialization of the apparatus), or whether the download of information relative to new program contents (new metadata) has been completed. This process is executed repeatedly until the result of such decision signifies that the hard disk recorder is in the state of its switch-on time or that the download of the new metadata has been completed. Upon completion of downloading the new metadata, it is assumed that the metadata shown in FIG. 5 or 6 are recorded in the storage 12.

When the result of the decision at step S1 signifies that the hard disk recorder is in the state of its switch-on time or that the download of the new metadata has been completed, the operation proceeds to step S2, where the CPU 8 a decision as to whether all of the metadata in the storage 12 have been searched. If the result of this decision signifies that all of the metadata have not yet been searched, the operation proceeds to step S3.

At step S3, the CPU 8 a decision as to whether any metadata having segment groups with the same identifier exist in the storage 12. If the result of this decision signifies such metadata do not exist, the operation returns to step S2, and the above process is executed repeatedly.

If the result of the decision at step S3 signifies the existence of metadata having segment groups with the same identifier attached thereto, the operation proceeds to step S4.

In the case of metadata 211-1 and 211-2 shown in FIG. 6, for example, the identifier "id_ichiro" attached thereto (in the 8th and 23rd lines), so that the metadata 211 having such segment groups are detected by the process at step S3.

At step S4, the CPU 8 another decision as to whether the identifier attached to the segment groups of the detected metadata is already registered on the list. If the result of this decision is affirmative to signify that the identifier is registered on the list, the operation proceeds to step S5, where an ordinal number and information for specifying the program of the relevant metadata (e.g., information recorded in block 201 in FIG. 5) are registered on the existing list. It is defined here that the list is registered per identifier so as to constitute the segment group by the process at step S7.

For example, there exists a list titled by the identifier "id_ichiro" when the metadata 211-1 including the segment groups with the attached identifier "id_ichiro" as shown in FIG. 6 have been detected, then an ordinal number "1" and the data in the 2nd to 7th lines (from Target to/Target) of the metadata 211-1 are registered on the existing list.

Thereafter, the operation returns to step S2, and the process mentioned above is executed repeatedly.

If the result of the decision at step S4 signifies that the identifier of the detected segment group is not yet registered on the list, the operation proceeds to step S6, where the CPU 8 creates a new list titled by the detected identifier and then registers, on the new list, constituents such as an ordinal number and information for specifying the program of the relevant metadata.

For example, when the metadata 211-2 including the segment group with the attached identifier "id_ichiro" have been detected and there exists no list titled by that identifier, then a new list titled by the identifier "id_ichiro" created, and subsequently an ordinal number "23" and the data in the 17th to 22nd lines (from Target to/Target) are registered on the new list as information for specifying the program of the metadata 211-2.

Thereafter the operation returns to step S2, and the process mentioned above is executed repeatedly.

If the result of the decision at step S2 signifies that all of the metadata in the storage 12 have been searched, the operation proceeds to step S7, where the CPU 8 makes another decision as to whether a list exists. If the result of this decision signifies that a list exists, the operation proceeds to step S8, where the CPU 8 rearranges the constituents (programs of the relevant metadata) in the order of ordinal numbers per the list, thereby generating metadata composed of one segment group. In rearranging the ordinal numbers, it is not necessary that the numerals be consecutive.

If the result of the decision at step S7 signifies that no list exists, the process at step S8 is skipped, and the routine is completed.

As metadata are thus generated by combining the segment groups to which the same identifier is attached, it becomes possible to create metadata having segment groups astride a plurality of programs. And the user is able to facilitate management of the data since the relationship can be simplified between the programs and the contents information (metadata) relative to the programs.

Figure 8:
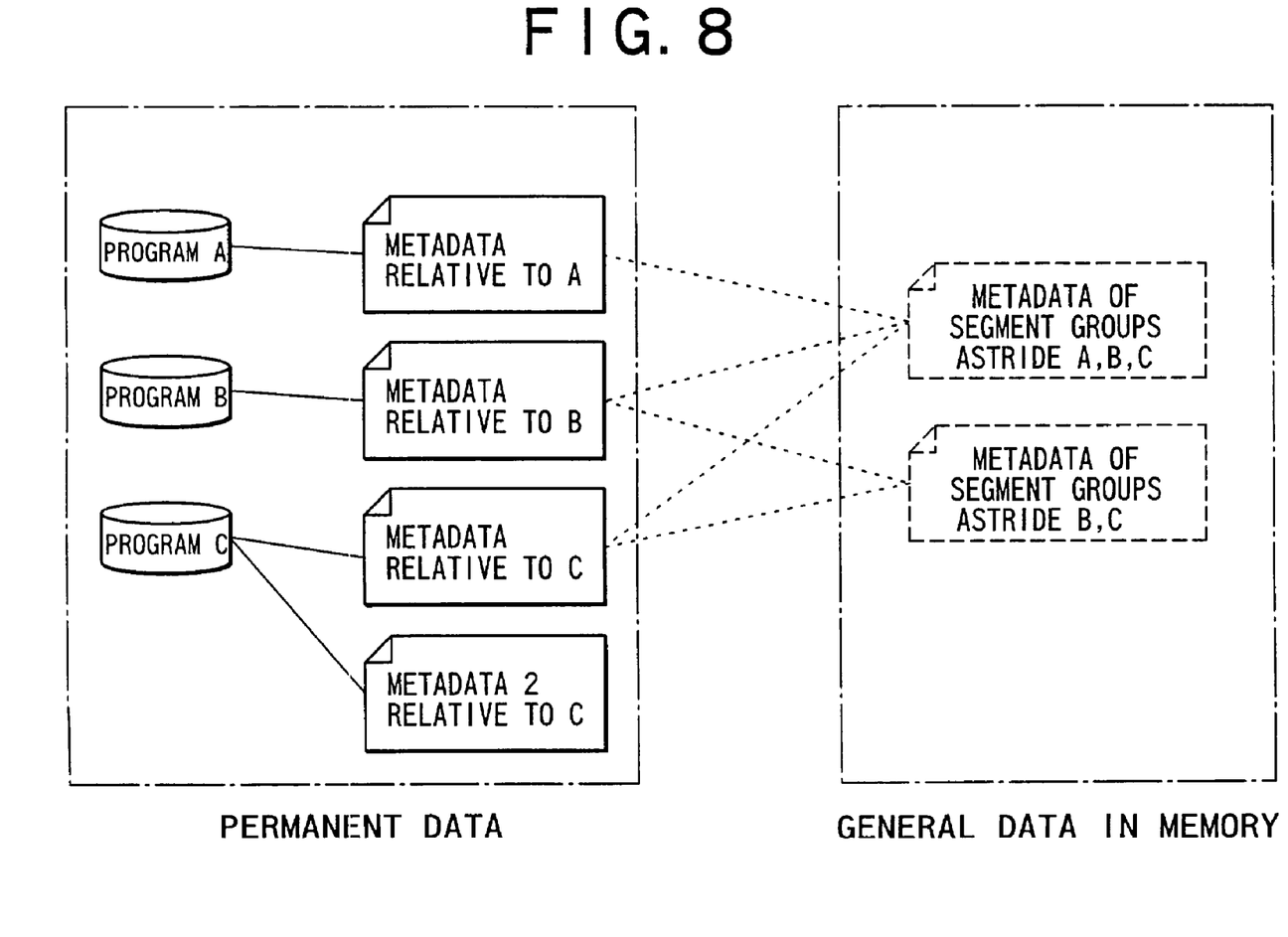
FIG. 8 is a diagram for explaining the relationship among programs, metadata and segment groups astride plural programs.

Referring now to FIG. 8, a further explanation will be given on the relationship among programs, metadata and other metadata having a segment group astride plural programs and obtained through the routine of processing the segment groups as described with reference to FIG. 7.

As shown in this diagram, the recorded programs A, B, C and the metadata relative thereto are permanent data which are stored in the nonvolatile RAM 11 or the storage 12. The relationship between the programs and the metadata in this case is one-to-many. More specifically, N metadata correspond to one program. And the metadata of segment groups astride the programs A to C, and the metadata of segment groups astride the programs B and C, are generated at each switch-on time and are recorded temporarily in the memory.

In this relationship, if the user commands deletion of, e.g., the program B by manipulating the remote controller 21, keyboard 13 or mouse 14, then the CPU 8 deletes the data of the program B while deleting only the metadata relative to the program B. Subsequently at the next switch-on time, the segment group forming routine described above with reference to FIG. 7 is executed to consequently re-form the metadata of a segment group astride plural programs out of the currently existing programs (i.e., programs A and C) and the metadata relative thereto recorded as permanent data.

Thus, it is not necessary for the user to always grasp the state with regard to the deletion of the program, hence realizing easy maintenance and management of the data.

In acquiring the metadata through a network such as the Internet, the user may simply acquire those relative to the recorded programs.

In this manner, a virtual program (segment groups) is composed of the contents information (metadata) of plural programs, whereby exclusive contents information relative to the virtual program is rendered unnecessary and, since the recorded program and the program contents information are in a one-to-many relationship, it becomes possible that, in the deletion of any program, the contents information of the relevant program can be achieved regardless of reference to the multiple programs.

The processing routine described above is executable by software as well as by hardware. When the processing routine is to be executed by software, the routine can be installed from a recording medium into, e.g., a computer where programs constituting the relevant software are incorporated in its exclusive hardware, or into a general-purpose personal computer which is capable of executing various functions in accordance with various programs installed therein.

The recording medium, where a program installed in and executable by a computer is recorded, may be a packaged one comprising, as shown in FIG. 2, a magnetic disk 41 (including a floppy disk), an optical disk 42 (including a CD-ROM (compact disc-read only memory) or a DVD (digital versatile disc)), a magneto-optical disk 43 (including an MD (Mini-Disc) (trademark)), a semiconductor memory 44, or a flash ROM or a hard disk where a program is recorded either temporarily or permanently. Recording of the program on the recording medium is executed via an interface, such as a router, a modem or the like, in compliance with requirements through wire or wireless communication media, such as a public network, local area network, Internet or digital broadcasting satellite.

In this specification, the steps that describe the program stored in the recording medium are executed in time series in accordance with the mentioned sequence, or may be executed in parallel or individually without being restricted to the time series processing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of generating an information list, the method comprising:
   retrieving information associated with segments from a plurality of stored video contents, the information comprising at least a topic identifier specifying a topic for each segment and a source identifier specifying a source, a start time and an end time for each segment;
   in response to determining that segments exist corresponding to a specified topic identifier on a specified topic and that the specified topic identifier is registered in an information list,
      registering the source identifier of the retrieved information and an associated ordinal number in the information list;
   in response to determining that segments exist corresponding to the specified topic identifier and that the specified topic identifier is not registered in an information list,
      generating an information list indicating the segments corresponding to the specified topic identifier, and registering the source identifier of the retrieved information and the associated ordinal number in the information list;

rearranging the information list in order of the ordinal numbers; and generating information associated with a single segment formed by combining the segments corresponding to the specified topic identifier according to the re-arranged information list;

said retrieving, generating, registering and rearranging steps being carried out at a switch-on time of a hard disk recorder so that the generated information list only includes information indicating segments of currently stored video contents.

2. The method according to claim 1, wherein the retrieved information is metadata of video contents.

3. The method according to claim 1, further comprising displaying, on display, a list of the segments and a picture representing a selected one of the segments.

4. The method according to claim 3, wherein the list of the segments includes at least one of a title of each of the segments or a reproduction time of each of the segments.

5. A method of producing a virtual program, the method comprising:

retrieving first information associated with segments from a plurality of stored contents on a specified topic based on a specified topic identifier, the first information comprising at least a topic identifier specifying a topic for each segment and a source identifier specifying a source, a start time and an end time for each segment;

determining if an information list corresponding to the specified topic identifier exists;

in response to determining that the information list exists, registering the source identifier of the retrieved information and an associated ordinal number in the information list;

in response to determining that the information list does not exist, generating an information list indicating the segments corresponding to the specified topic identifier, and registering the source identifier of the retrieved first information and an associated ordinal number in the information list;

rearranging the information list in order of the ordinal numbers; and forming second information associated with a single segment formed by combining the segments corresponding to the specified topic identifier according to the re-arranged information list;

said retrieving, determining, generating, registering, rearranging, and forming steps being carried out at a switch-on time of a hard disk recorder so that the generated information list only includes information indicating segments of currently stored video contents.

6. The method according to claim 5, wherein the first information is metadata of video contents.

7. The method according to claim 5, further comprising displaying, on display, a list of the segments and a picture representing a selected one of the segments.

8. The method according to claim 7, wherein the list of the segments includes at least one of a title of each of the segments or a reproduction time of each of the segments.

9. An apparatus for generating an information list, the apparatus comprising:

retrieving means for retrieving first information associated with segments from a plurality of stored video contents on a specified topic based on a specified topic identifier, the first information comprising at least a topic identifier specifying a topic for each segment and a source identifier specifying a source, a start time and an end time for each segment;

determining means for determining if an information list corresponding to the specified topic identifier exists;

generating means for generating an information list indicating the segments corresponding to the specified topic identifier in response to the determining means determining that the information list does not exist;

registering means for registering the source identifier of the retrieved information and an associated ordinal number in the information list;

rearranging means for rearranging the information list in order of the ordinal numbers; and forming means for forming second information associated with a single segment formed by combining the segments corresponding to the specified topic identifier according to the re-arranged information list;

said retrieving, determining, generating, registering, rearranging, and forming being carried out at a switch-on time of a hard disk recorder so that the generated information list only includes information indicating segments of currently stored video contents.

10. The apparatus according to claim 9, wherein the retrieved first information is metadata of video contents.

11. The apparatus according to claim 9, further comprising display means for displaying a list of the segments and a picture representing a selected one of the segments.

12. The apparatus according to claim 11, wherein the list of the segments includes at least one of a title of each of the segments or a reproduction time of each of the segments.

13. A system for generating an information list, the system comprising:

a retrieving unit for retrieving first information associated with segments from a plurality of stored video contents on a specified topic based on a specified topic identifier, the first information comprising at least a topic identifier specifying a topic for each segment and a source identifier specifying a source, a start time and an end time for each segment;

a determining unit for determining if an information list corresponding to the specified topic identifier exists;

a generating unit for generating an information list indicating the segments corresponding to the specified topic identifier in response to the determining unit determining that the information list does not exist;

a registering unit for registering the source identifier of the retrieved information and an associated ordinal number in the information list;

a rearranging unit for rearranging the information list in order of the ordinal numbers; and a forming unit for forming second information associated with a single segment formed by combining the segments corresponding to the specified topic identifier according to the re-arranged information list;

said retrieving, determining, generating, registering, rearranging, and forming being carried out at a switch-on time of a hard disk recorder so that the generated information list only includes information indicating segments of currently stored video contents.

14. The system according to claim 13, wherein the retrieved first information is metadata of video contents.

15. The system according to claim 13, further comprising a display unit for displaying a list of the segments and a picture representing a selected one of the segments.

16. The system according to claim 15, wherein the list of the segments includes at least one of a title of each of the segments or a reproduction time of each of the segments.

* * * * *